J. G. HALLAS & J. N. WEBB.
Chuck for Metal Lathes.

No. 197,359. Patented Nov. 20, 1877.

Witnesses:

Inventors:
Jas. G. Hallas & Jas. N. Webb
By Atty.

UNITED STATES PATENT OFFICE.

JAMES G. HALLAS AND JAMES N. WEBB, OF WATERBURY, CONNECTICUT.

IMPROVEMENT IN CHUCKS FOR METAL-LATHES.

Specification forming part of Letters Patent No. 197,359, dated November 20, 1877; application filed April 21, 1877.

*To all whom it may concern:*

Be it known that we, JAMES G. HALLAS and JAMES N. WEBB, both of Waterbury, in the county of New Haven and State of Connecticut, have invented a new Improvement in Adjustable Chucks; and we do hereby declare the following, when taken in connection with the accompanying drawings and the letters of reference marked thereon, to be a full, clear, and exact description of the same, and which said drawings constitute part of this specification, and represent, in—

Figure 1:
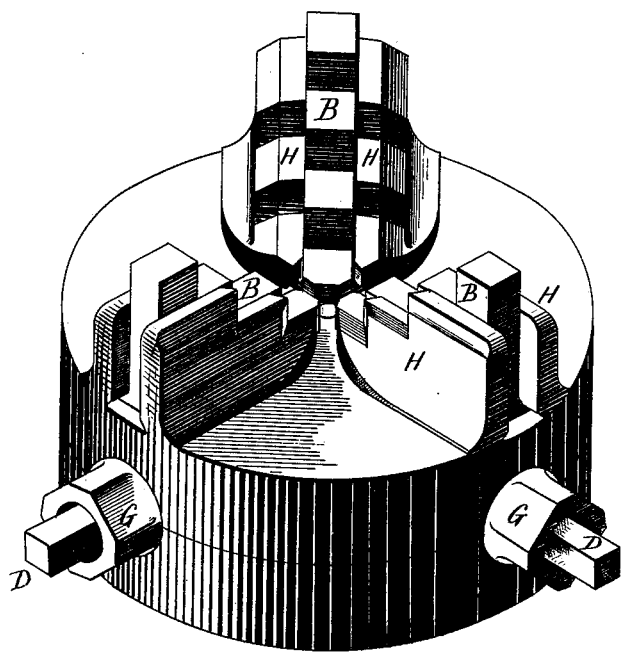
Figure 2:
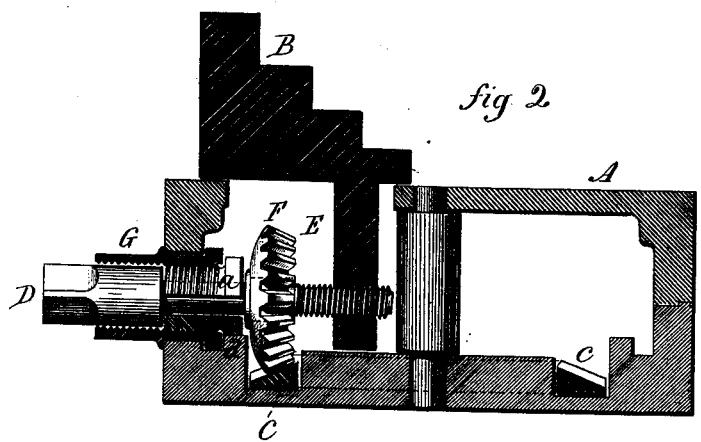

Figure 1, a perspective view, and in Fig. 2 a longitudinal section, of one of the jaws and its moving mechanism.

This invention relates to an improvement in chucks for lathes and like purposes.

In the usual construction of this class of tools the three jaws are arranged for a radial movement, and so combined that all must move simultaneously and to the same extent; but it frequently occurs that it is desirable to adjust the jaws independently of each other.

The object of this invention is to provide each jaw with an adjustment independent of that which is common to all the jaws; and it consists in combining, with the mechanism which simultaneously moves all the jaws, an independent mechanism for each jaw, so that the jaws may be moved simultaneously, or each independent of the other, and as more particularly recited in the following specification and claims.

A represents the shell or head, on the surface of which, in suitable grooves, the three radial jaws B are arranged so as to move freely radially to or from the center. Within the shell a bevel-wheel, C, is arranged to revolve freely and concentric with the center of the chuck. Each jaw is provided with the moving spindle D, its inner end screw-threaded into an arm, E, extending from the jaws. On each of these spindles is a bevel-pinion, F, working in the bevel-gear C; hence, by turning the spindle D, the gear C will be correspondingly turned, and all the screws turned, to move the respective jaws radially, and in substantially the usual manner.

Around each of the spindles D is a sleeve, G, arranged in the edge of the shell, as seen in Fig. 2, and so as to be turned freely independent of the spindle D, and yet held firmly from axial movement. Internally, this sleeve G is screw-threaded, and on the spindle a second sleeve, *a*, is arranged, its exterior thread corresponding to the internal thread of the sleeve G, and this second sleeve is arranged between shoulders on the spindle, and is prevented from turning by a flat side taking a seat, at *d*, on the corresponding surface on the shell.

The spindle may turn freely within this shell *a*.

The pinion is fitted to the spindle so that, while it will turn the spindle, it will allow the spindle to move axially without turning the pinion; hence, by turning the sleeve G, the sleeve *a* will be moved correspondingly in an axial direction, carrying with it the spindle D, and the jaw connected thereto, thus enabling the movement of each jaw independent of the others.

It will be understood that the outer end of the sleeve G is constructed with convenient means for turning the same. (Here represented as of polygonal form.)

By this construction it will be seen that while the jaws may be all moved simultaneously, by simply turning one of the spindles D, either may be adjusted independently of the other by turning the sleeve G on the spindle of the jaw which is to be adjusted. In such an adjustment the spindle will slide freely through the pinion without changing the position of the pinion.

In the usual construction, the work rests upon the surface of the jaws, and as this surface is liable to wear or vary from use, it soon follows that the true level bed desirable cannot be had. To take this bed or bearing from the jaws, there is arranged on the face of the chuck, and preferably each side of the jaws, a bearing, H, each having a surface or surfaces slightly above the face of the jaws, as seen in Fig. 1; hence the work will rest on the surface of these bearings, and the jaws will move without the face coming in contact with the work.

It is not essential that all the jaws have this independent movement, as in some cases one only may have this independent movement; but it is desirable, for convenience, that it be applied to all.

We do not broadly claim a chuck having radially-moving jaws combined with mechanism to simultaneously move all the jaws, or to move independently either of the jaws, as such, we are aware, is not new.

We claim—

1. The combination of the radially-moving jaws, a screw-spindle for each jaw, a pinion on each spindle, a gear to connect all said pinions, an externally screw-threaded sleeve, $a$, on one or more of said spindles, a sleeve, G, internally threaded to receive said sleeve $a$, the combination and arrangement being substantially as and for the purpose described.

2. In a chuck having radially-moving jaws, the combination, with said jaws, of bearings H, elevated above the surface of said jaws, substantially as described.

JAMES G. HALLAS.
JAMES N. WEBB.

Witnesses:
GEORGE W. ROOT,
BENJAMIN HALLAS.